(12) United States Patent
Gandhi et al.

(10) Patent No.: US 8,506,893 B2
(45) Date of Patent: *Aug. 13, 2013

(54) SELECTIVE CATALYTIC REDUCTION CATALYST SYSTEM WITH EXPANDED TEMPERATURE WINDOW

(75) Inventors: Harendra S Gandhi, West Bloomfield, MI (US); Joseph Robert Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 780 days.

This patent is subject to a terminal disclaimer.

(21) Appl. No.: 12/108,175

(22) Filed: Apr. 23, 2008

(65) Prior Publication Data

US 2009/0266063 A1    Oct. 29, 2009

(51) Int. Cl.
*B01D 50/00* (2006.01)

(52) U.S. Cl.
USPC .......................................................... 422/171

(58) Field of Classification Search
USPC .......................................... 422/171, 177, 180
See application file for complete search history.

(56) References Cited

U.S. PATENT DOCUMENTS

| | | | |
|---|---|---|---|
| 5,850,734 A | 12/1998 | Ketcham | |
| 5,910,097 A | 6/1999 | Boegner et al. | |
| 6,167,699 B1 | 1/2001 | Johnston et al. | |
| 6,173,568 B1 | 1/2001 | Zurbig et al. | |
| 6,244,041 B1 | 6/2001 | Bartley | |
| 6,502,391 B1 | 1/2003 | Hirota et al. | |
| 6,755,014 B2 | 6/2004 | Kawai et al. | |
| 6,826,906 B2 | 12/2004 | Kakwani et al. | |
| 6,832,473 B2 | 12/2004 | Kupe et al. | |
| 6,832,474 B2 | 12/2004 | Hirooka et al. | |
| 6,955,042 B1 | 10/2005 | Wnuck et al. | |
| 6,973,777 B2 | 12/2005 | Bayerle et al. | |
| 7,121,079 B2 | 10/2006 | Calvo et al. | |
| 7,390,469 B2 | 6/2008 | Montreuil et al. | |

(Continued)

FOREIGN PATENT DOCUMENTS

WO    2005073526 A1    11/2005

OTHER PUBLICATIONS

Brian Patrick Rothwell "Series Production of Bosch Denoxtronic for SCR Catalytic Converters," http://www.all4engineers.com/index.php:sid=e5526babed133b6f1821527c839417d2/site=a4e/Ing=en/do=show/alloc=1/id=4886; Oct. 25, 2007—4 pages.

(Continued)

*Primary Examiner* — Tom Duong
(74) *Attorney, Agent, or Firm* — Damian Porcari; Brooks Kushman P.C.

(57) ABSTRACT

According to one embodiment of the present invention a selective reduction catalyst system with a broad temperature window for lean-burn gasoline and diesel engines is disclosed. The system includes a first and second zone, wherein the first zone is composed of an iron SCR catalyst and a second zone is composed of a copper SCR catalyst, and wherein the second zone is positioned downstream of the first zone. In another embodiment, a small copper SCR catalyst is placed in front of a second zone composed of an iron SCR catalyst and a third zone composed of a copper SCR catalyst, wherein the volume of the first copper SCR catalyst is a fraction of the volume of the second copper SCR catalyst. In yet another embodiment, a diverter valve would be included in the system to eliminate any $NO_x$ penalty produced by the front Cu SCR catalyst.

12 Claims, 7 Drawing Sheets

(56) References Cited

U.S. PATENT DOCUMENTS

| | | |
|---|---|---|
| 7,650,746 B2 | 1/2010 | Hu et al. |
| 6,170,259 B1 | 1/2011 | Boegner et al. |
| 2004/0083716 A1 | 5/2004 | Twigg |
| 2004/0128982 A1* | 7/2004 | Patchett et al. .............. 60/274 |
| 2004/0258594 A1 | 12/2004 | Andreasson et al. |
| 2005/0069476 A1* | 3/2005 | Blakeman et al. ......... 423/239.1 |
| 2008/0008629 A1* | 1/2008 | Doring et al. .............. 422/171 |

OTHER PUBLICATIONS

Cavataio et al., "Combined Fe-Cu SCR Systems with Optimized Ammonia to NOx Ratio for Diesel NOx Control"; SAE Int. J. Fuels Lubr. 1(1):603-610, 2009, doi:10.4271/2008-01-1185, Date Published: Apr. 14, 2008; 9 pages.

* cited by examiner

SELECTIVE CATALYTIC REDUCTION CATALYST SYSTEM WITH EXPANDED TEMPERATURE WINDOW

BACKGROUND OF THE INVENTION

1. Field of the Invention

One aspect of the present invention relates to a selective catalytic reduction catalyst system for lean $NO_x$ control with a broad temperature window for lean-burn gasoline and diesel engines. Another aspect of the present invention relates to a selective catalytic reduction catalyst system that provides high lean $NO_x$ conversion over a broad range of NO concentrations.

In another embodiment of this invention, a selective catalytic reduction catalyst provides effective lean $NO_x$ control with a broad temperature window, even for cold start $NO_x$ emissions.

2. Background Art

Selective Catalytic Reduction (SCR) with $NH_3$ is a leading candidate for $NO_x$ control on lean-burn gasoline engines and diesel engines. The SCR catalyst uses base metals to promote the reaction between $NO_x$ and $NH_3$ to produce $N_2$ under lean conditions. The other leading candidate for $NO_x$ control on lean applications is the lean $NO_x$ trap (LNT), a catalyst containing precious metal (e.g., platinum, palladium, rhodium) which stores the $NO_x$ under lean conditions and reduces the stored $NO_x$ to $N_2$ during periodic rich purges. Compared to a LNT, SCR offers several advantages. SCR catalysts can operate over a broader temperature range than LNTs, and SCRs do not require rich purges, which benefits the fuel economy. SCR catalysts are also more robust to the feedgas $NO_x$ concentration. Finally, SCR catalysts do not use precious metals, and thus the catalyst costs are lower.

While SCR catalysts have several advantages, SCR catalysts have certain limitations. The SCR formulations that are leading contenders for $NO_x$ control on vehicles have applicability either at the high temperature end or the low temperature end. There is thus a need for a SCR catalyst system that is effective across a broader range of temperatures to provide effective lean $NO_x$ control during both low load and high load operation on a vehicle. A broader temperature window also offers more flexibility in regards to the location of the SCR converter in the exhaust system on a vehicle. The SCR catalyst system must also provide good $NO_x$ control following a cold start on a vehicle. This is particularly true on a diesel engine, where the SCR catalyst provides the only $NO_x$ control. In addition, since the engine can emit different levels of NO, it is desirable that the SCR catalyst system provide high $NO_x$ conversion over a broad range of NO concentrations.

SUMMARY OF THE INVENTION

According to one embodiment of the present invention, a selective catalyst reduction system for $NO_x$ control on lean-burn gasoline and diesel engines is provided, comprising a first and second zone, wherein the first zone is composed of iron and a second zone is composed of copper, and wherein the second zone is positioned downstream of the first zone.

According to another embodiment of the present invention, a selective catalytic reduction system for lean-burn gasoline and diesel engines is provided, comprising a first, second and third zone, wherein the first zone is composed of copper, the second zone is composed of iron and the third zone is composed of copper, wherein the third zone is positioned downstream of the first and second zone.

These and other aspects of the present invention will be better understood in view of the following detailed description of the invention.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

It bears emphasis that the percentage of volume identified for each of the SCR zones is the ratio of the volume of that section of catalyst to the standard sample volume used on that laboratory reactor, which is approximately 6 cc and corresponds to a space velocity of 25,000 $hr^{-1}$. Notably, the space velocities specified in this document are the ratios of the gas flow rate of 2.5 liters/minute and the total SCR catalyst volume used on the reactor. The performance data collected with small catalyst samples on the laboratory reactor are indicative of the performance that can be expected with full-size converters on an engine when operating at the same space velocity.

DETAILED DESCRIPTION OF THE PREFERRED EMBODIMENT(S)

To date, two different SCR formulations are being developed for vehicle applications. One uses copper (Cu) as the active element, and the other uses iron (Fe) as the active element. Cu-based SCR catalysts generally work better than Fe-based SCR catalysts at low temperatures, while Fe-based SCR catalysts are generally more effective at high temperatures.

Figure 1:
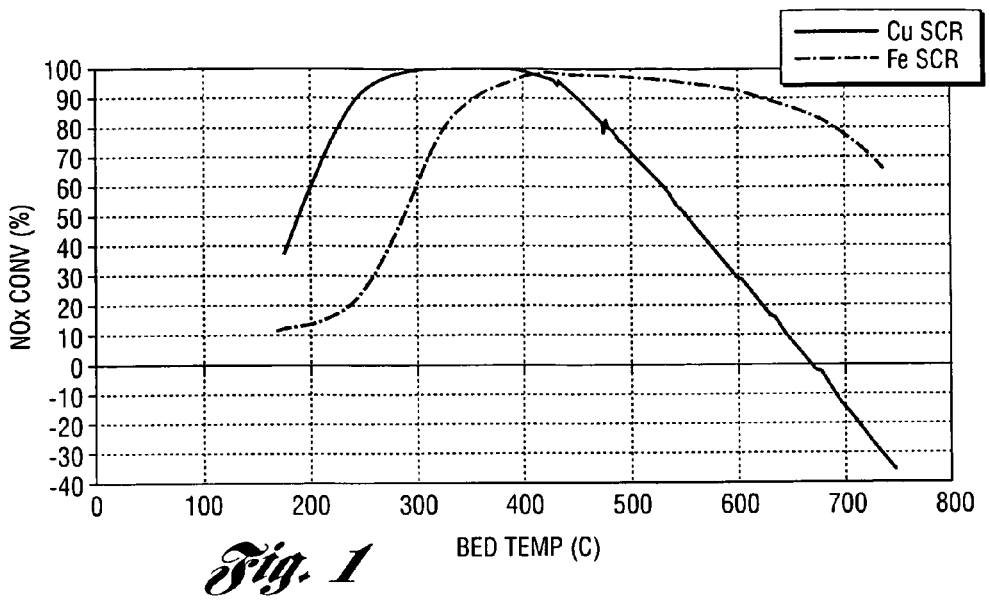
FIG. 1 shows temperature windows of Fe-based and Cu-based SCR formulations. Catalysts aged behind TWC at 800° C. inlet with continuous lean operation for 34 hr. Evaluated at 25K hr$^{-1}$ during slow ramps with 500 ppm NO and $NH_3$, 5% $O_2$, 10% $CO_2$, 10% $H_2O$, and balance $N_2$.

To demonstrate, slow temperature ramps were performed under lean conditions at 25K $hr^{-1}$ with a leading Cu SCR catalyst and a leading Fe SCR catalyst after the SCR catalysts were aged behind a TWC for 34 hrs in lean exhaust with an inlet temperature of 800° C. During the ramps, the NO and $NH_3$ concentrations were both controlled at 500 ppm. FIG. 1 compares the temperature windows of the two SCR catalysts. The Cu SCR catalyst reduces $NO_x$ with an efficiency at or above 90% between 250° C. and 450° C., while the Fe SCR catalyst reduces $NO_x$ with an efficiency at or above 90% between 355° C. and 625° C. Above 670° C., the Cu SCR catalyst oxidizes some of the $NH_3$ to NO, producing a negative $NO_x$ efficiency.

As such, while a Fe SCR catalyst and a Cu SCR catalyst are each useful under a particular range of operating temperatures, neither is capable of efficiently converting $NO_x$ over the full range of operating temperatures that can be encountered on both diesel and lean-burn gasoline engines. The exhaust temperatures during low to medium load conditions on a gasoline engine can range from 250 to 600 degrees Celsius, in contrast with a diesel engine in which the higher mechanical efficiency and leaner air/fuel ratios produce exhaust temperatures in the range of 150 to 400° C. Accordingly, under one embodiment of this invention, the temperature range at which the SCR optimally functions can be broadened by combining a Fe SCR catalyst with a Cu SCR catalyst in a particular manner.

Figure 2:
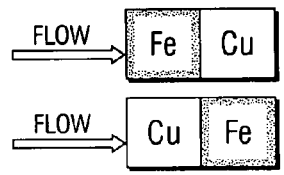
FIG. 2 depicts two different zoned configurations for a SCR catalyst, the first configuration comprising a Fe SCR catalyst followed by a Cu SCR catalyst and the second configuration comprising a Cu SCR catalyst followed by a Fe SCR catalyst according to one embodiment of the present invention.
Figure 3:
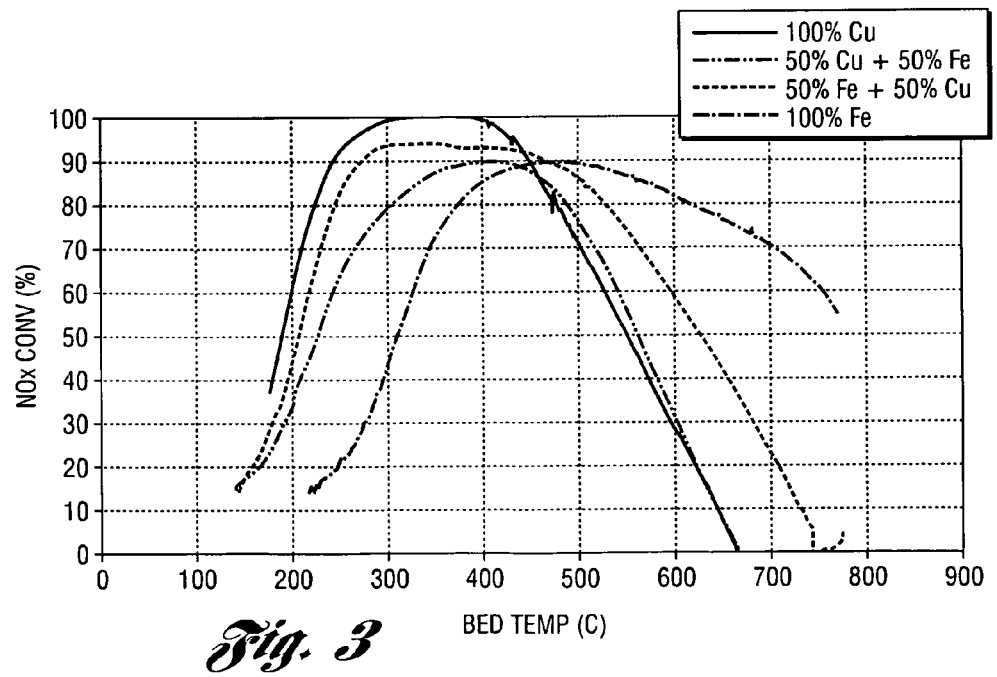
FIG. 3 shows the temperature windows for the 2 SCR systems depicted in FIG. 2 along with the temperatures windows for the 100% Fe and 100% Cu SCR catalysts, where the percentage of 50% or 100% before the catalyst designation (Fe or Cu) represents the ratio of the volume of that section of SCR catalyst and the standard sample volume, which produces a space velocity of 25,000 hr$^{-1}$.

To demonstrate, a thermally aged Fe SCR catalyst was combined with a thermally aged Cu SCR catalyst in two different configurations, as shown in FIG. 2. In one system, the front half of the Cu SCR catalyst was followed by the rear half of the Fe SCR catalyst, a 50% Cu+50% Fe SCR system. In the other system, the front half of the Fe SCR catalyst was followed by the rear half of the Cu SCR catalyst, a 50% Fe+50% Cu SCR system. FIG. 3 shows the temperature windows for these 2 systems along with the temperatures windows for the 100% Fe and 100% Cu catalysts, where 100% indicates the standard sample volume typically used on the reactor; the standard sample volume results in a space velocity of 25K $hr^{-1}$. These catalysts were aged behind a TWC at 800° C. inlet with lean operation for 34 hours and evaluated at 25K $hr^{-1}$ during slow ramps with 500 ppm NO and $NH_3$, 5% $O_2$, 10% $CO_2$, 10% $H_2O$, and balance $N_2$.

As can be seen from FIG. 3, the 50% Fe+50% Cu system outperformed the 50% Cu+50% Fe system at all temperatures above 150° C. It is believed that the 50% Fe+50% Cu system was better than the 50% Cu+50% Fe system at low temperatures because the front half of the SCR catalyst degrades more than the back half during high temperature aging. This can be attributed to some of the HC and CO slipping through the three-way catalyst (TWC) or diesel oxidation catalyst (DOC) and oxidizing on the front portion of the SCR catalyst, releasing exothermic heat which generates higher temperatures on that portion of the SCR catalyst. Therefore, it is believed that by placing the Cu SCR catalyst in the rear position, the Cu SCR catalyst is protected from these exothermic reactions during aging, and its low temperature activity is better preserved.

As can further be seen from FIG. 3, the 50% Fe+50% Cu system was also better than the 50% Cu+50% Fe system at high temperatures. It is believed that with the 50% Cu+50% Fe system, the front Cu SCR catalyst oxidizes some of the $NH_3$ to NO at high temperatures, which strips the rear Fe SCR catalyst of $NH_3$ that is needed to reduce the $NO_x$ and also generates more NO emissions. Therefore, it is believed that by having the Fe SCR catalyst first in the system, it has sufficient $NH_3$ that can be used to reduce $NO_x$ at high temperatures. While the Fe SCR catalyst does degrade more in the front position than it would in the rear position for the same reasons mentioned above, the Fe SCR catalyst is used primarily to provide $NO_x$ conversion at high temperatures, and the high temperature performance is less sensitive to thermal aging effects than the low temperature performance.

Figure 4:
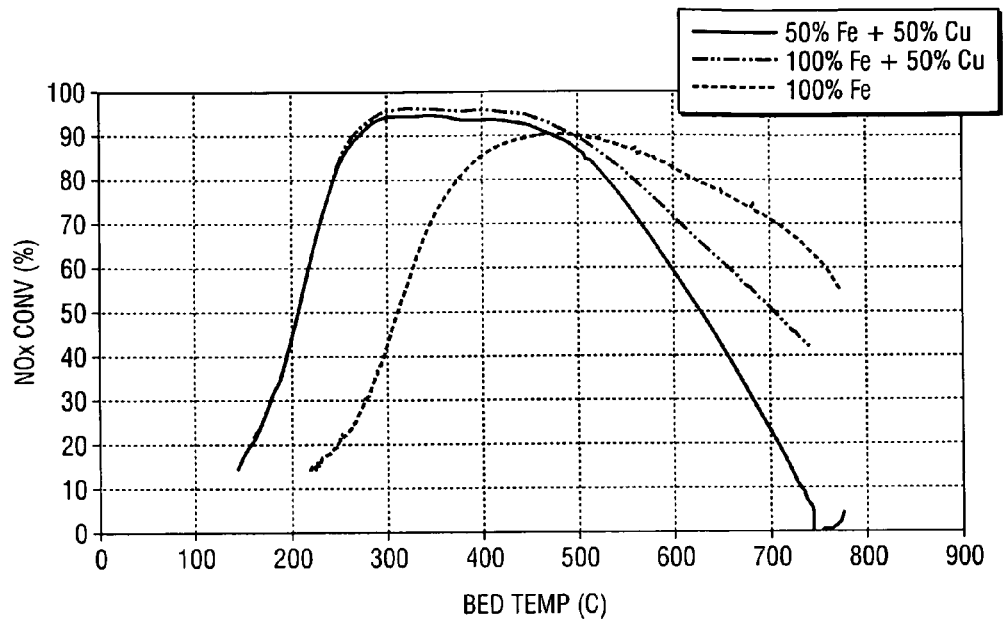
FIG. 4 depicts temperature windows of 50% Fe+50% Cu, 100% Fe+50% Cu, and 100% Fe SCR catalysts according to one embodiment of the present invention.

FIG. 3 shows that the 50% Fe+50% Cu system significantly outperformed the 100% Fe SCR at low temperatures. However, the 50% Fe+50% Cu system had lower performance than the 100% Fe SCR catalyst at high temperatures. This is partly because half of the Fe SCR catalyst had been replaced with the Cu SCR catalyst in the 50% Fe+50% Cu system. However, even when the 100% Fe SCR catalyst was placed in front of the rear half of the Cu SCR catalyst and evaluated, FIG. 4 shows that the 100% Fe+50% Cu SCR system still had lower $NO_x$ conversion performance at high temperatures than the 100% Fe SCR catalyst. This is because the rear Cu SCR catalyst is believed to have oxidized some of the $NH_3$ that slipped through the Fe catalyst and generated NO at high temperatures, which lowered the overall $NO_x$ efficiency.

The temperature window data shown in FIG. 4 shows temperature windows of 50% Fe+50% Cu, 100% Fe+50% Cu, and 100% Fe SCR catalysts, where 100% indicates the standard sample volume that produces a space velocity of 25K $hr^{-1}$. These catalysts were aged behind a TWC at 800° C. inlet with lean operation for 34 hours and evaluated during slow ramps with 500 ppm NO and $NH_3$, 5% $O_2$, 10% $CO_2$, 10% $H_2O$, and balance $N_2$.

Based on the studies conducted, it is believed that to minimize the oxidation of $NH_3$ to NO by the rear Cu SCR at high temperatures, the front Fe SCR catalyst must be large enough to use as much of the $NH_3$ as possible for $NO_x$ reduction at high temperatures. To investigate this, different volumes of an aged Fe SCR catalyst were placed in front of the rear half of the aged Cu SCR catalyst and evaluated on temperature ramps with 500 ppm NO and $NH_3$.

Figure 5:
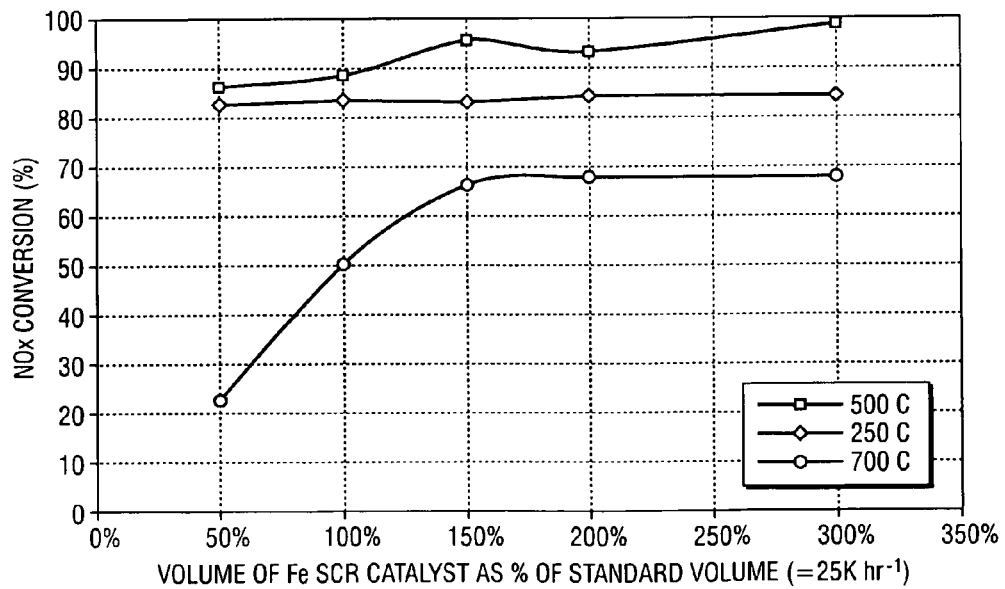
FIG. 5 is a graph that shows $NO_x$ conversion at different temperatures as a function of the volume of Fe SCR catalyst with 500 ppm NO and $NH_3$; the Fe SCR catalyst is followed by a 50% Cu SCR catalyst in all cases.

To investigate the robustness of the system at different temperatures, FIG. 5 shows the $NO_x$ conversion as a function of the volume of Fe SCR catalyst at 250° C., 500° C., and 700° C. with 500 ppm NO and $NH_3$; the exhaust also contained 5% $O_2$, 10% $CO_2$, 10% $H_2O$, and balance $N_2$. The volume of Fe SCR catalyst is expressed as a percentage of the normal sample volume, which produces a space velocity of 25,000 $hr^{-1}$ under the conditions of these experiments. The $NO_x$ conversion at 250° C. was relatively unaffected by the volume of the Fe SCR catalyst, suggesting that the rear Cu SCR catalyst provides most of the $NO_x$ activity at this low temperature. The $NO_x$ conversion at 500° C. improved from 86% to 96% as the volume of Fe SCR catalyst increased from 50% to 150%, and the $NO_x$ conversion further increased from 96% to 99% as the volume of Fe SCR catalyst increased from 150% to 300%. The $NO_x$ conversion at 700° C. improved from 23% to 67% as the volume of Fe SCR catalyst increased from 50% to 150% and was relatively constant for volumes of Fe SCR catalyst beyond 150%.

Figure 6:
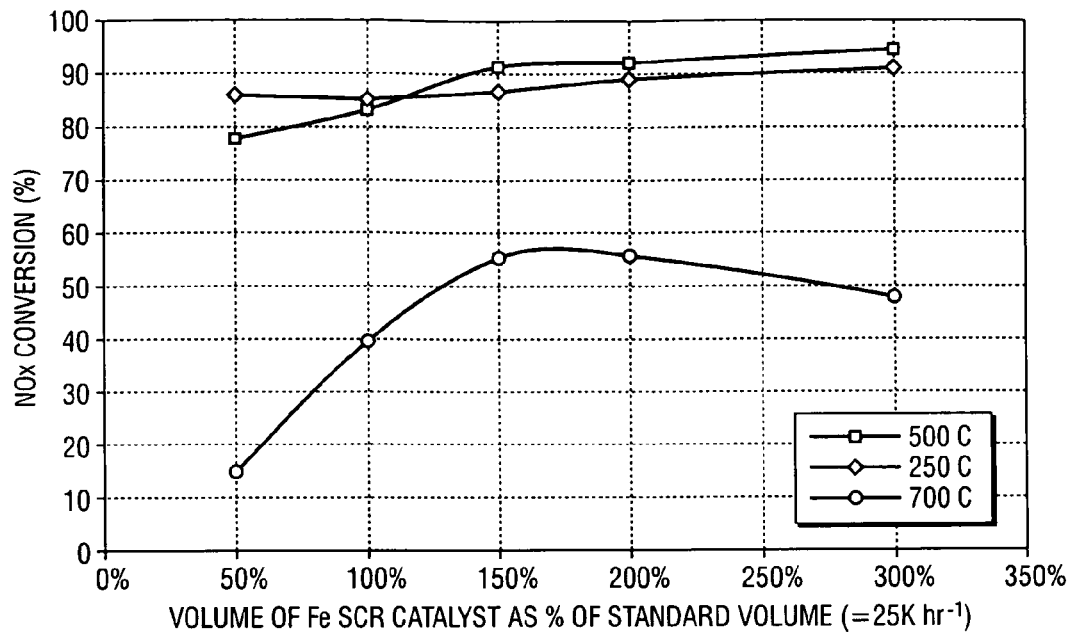
FIG. 6 is a graph that shows $NO_x$ conversion at different temperatures as a function of volume of Fe SCR catalyst with 250 ppm NO and $NH_3$; the Fe SCR catalyst is followed by a 50% Cu SCR catalyst in all cases.

The tests in FIG. 5 were performed with a NO concentration of 500 ppm. To investigate the robustness of the system to NO concentration, FIG. 6 shows the corresponding data with 250 ppm NO and $NH_3$ as a function of volume of Fe SCR catalyst for a Fe SCR catalyst followed by a 50% Cu SCR catalyst. Once again, 100% indicates the standard sample volume which produces a space velocity of 25K $hr^{-1}$. Catalysts tested with 250 ppm NO and $NH_3$, the exhaust also contains 5% $O_2$, 10% $CO_2$, 10% $H_2O$, and balance $N_2$. As shown in FIG. 6, the performance at 250° C. is again somewhat insensitive to the volume of Fe SCR catalyst, although the conversion did increase from 85% to 91% as the volume of Fe SCR catalyst increased from 100% to 300%. The performance at 500° C. improved from 78% to 91% as the volume of Fe SCR catalyst increased from 50% to 150%, and the performance continued to improve from 91% to 95% as the volume of Fe SCR catalyst further increased from 150% to 300%. At 700° C., the performance was maximized with 150-200% Fe. The drop in conversion with 300% Fe was questionable, as it was not observed with 500 ppm NO in FIG. 5.

Figure 7:
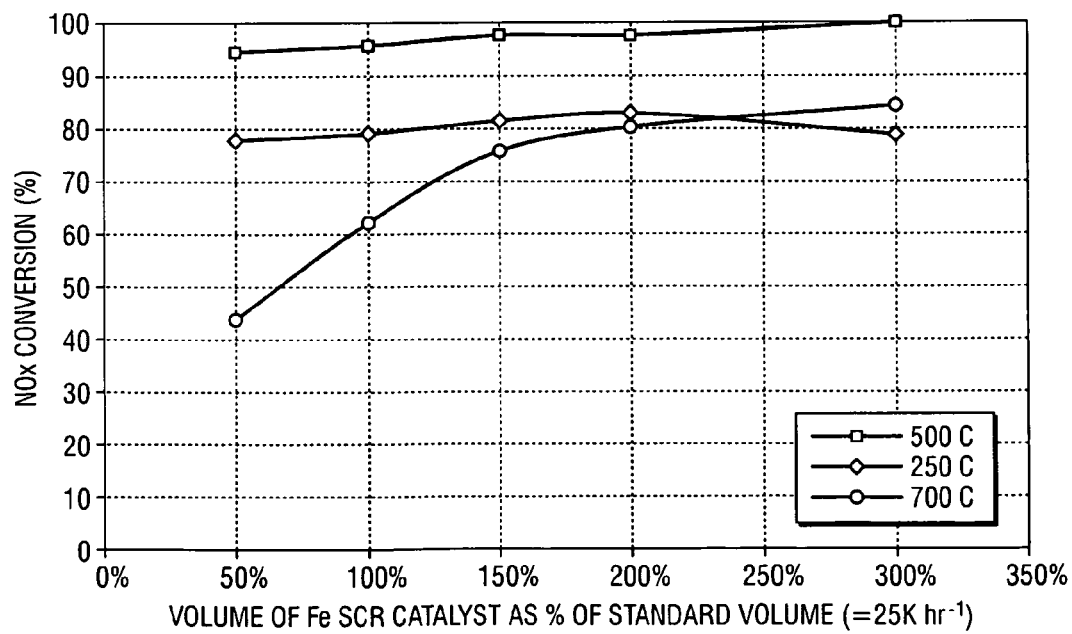
FIG. 7 is a graph showing $NO_x$ conversion at different temperatures as a function of volume of Fe SCR catalyst with 1000 ppm NO and $NH_3$; the Fe SCR catalyst is followed by a 50% Cu SCR catalyst in all cases.

FIG. 7 shows the corresponding data with 1000 ppm NO and $NH_3$ as a function of volume of Fe SCR catalyst for a Fe SCR catalyst followed by 50% Cu SCR catalyst, where 100% indicates the standard sample volume and a space velocity of 25K $hr^{-1}$. Catalysts tested with 1000 ppm NO and $NH_3$, the exhaust also contains 5% $O_2$, 10% $CO_2$, 10% $H_2O$, and balance $N_2$. The conversion at 250° C. was fairly insensitive to the volume of Fe SCR catalyst. The conversion at 500° C. increased from 95% to 100% as the volume of Fe SCR catalyst increased from 50% to 300%. The conversion at 700° C. improved from 43% to 76% as the volume of Fe SCR catalyst increased from 50% to 150%. Unlike the data in FIGS. 5 and 6, the performance continued to increase from 76% to 84% as the volume of Fe SCR catalyst increased from 150% to 300%.

Figure 8:
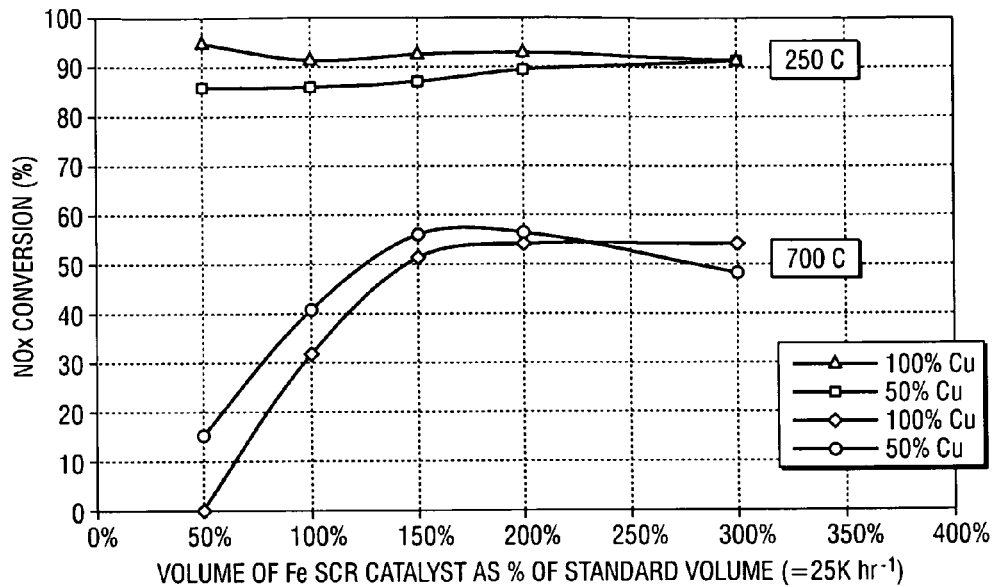
FIG. 8 is a graph showing $NO_x$ conversion at 250° C. and 700° C. with 250 ppm NO and $NH_3$ as a function of volume of Fe SCR catalyst; the Fe SCR catalyst is followed by either a 50% or 100% Cu SCR catalyst.
Figure 9:
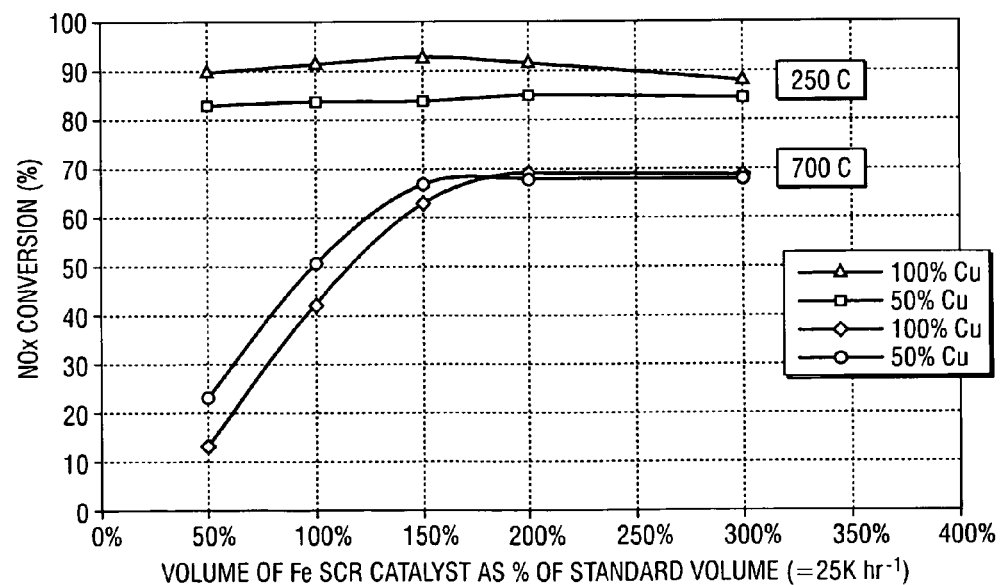
FIG. 9 is a graph showing $NO_x$ conversion at 250° C. and 700° C. with 500 ppm NO and $NH_3$ as a function of volume of Fe SCR catalyst; the Fe SCR catalyst is followed by either a 50% or 100% Cu SCR catalyst.
Figure 10:
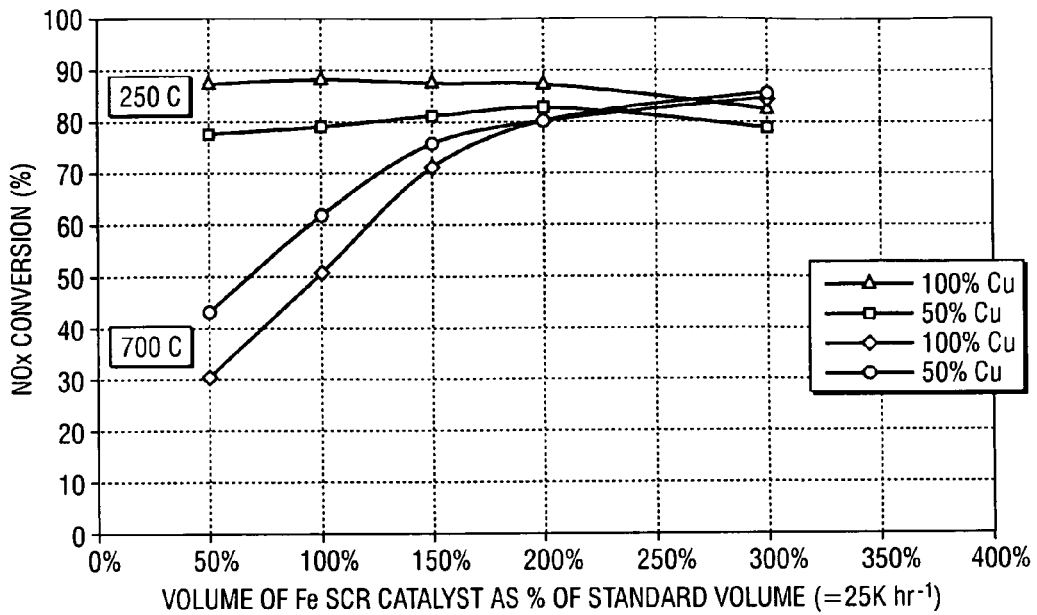
FIG. 10 is a graph showing $NO_x$ conversion at 250° C. and 700° C. with 1000 ppm NO and $NH_3$ as a function of volume of Fe SCR catalyst; the Fe SCR catalyst is followed by either a 50% or 100% Cu SCR catalyst.
Figure 11:
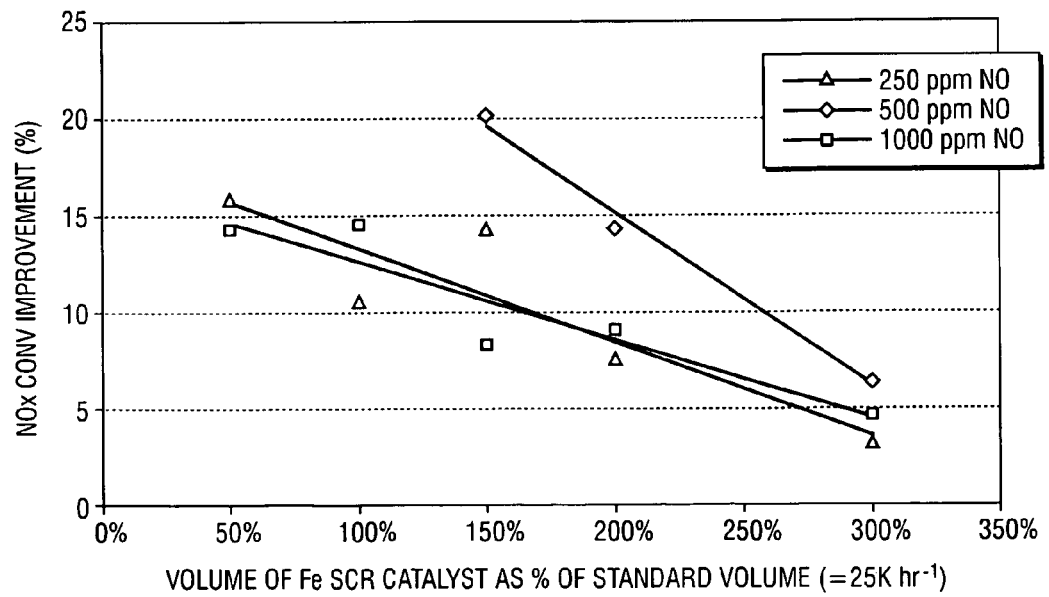
FIG. 11 is a graph that shows the improvement in $NO_x$ conversion at 200° C. from increasing the volume of Cu SCR catalyst from 50% to 100% as a function of the volume of Fe SCR catalyst.
Figure 12:
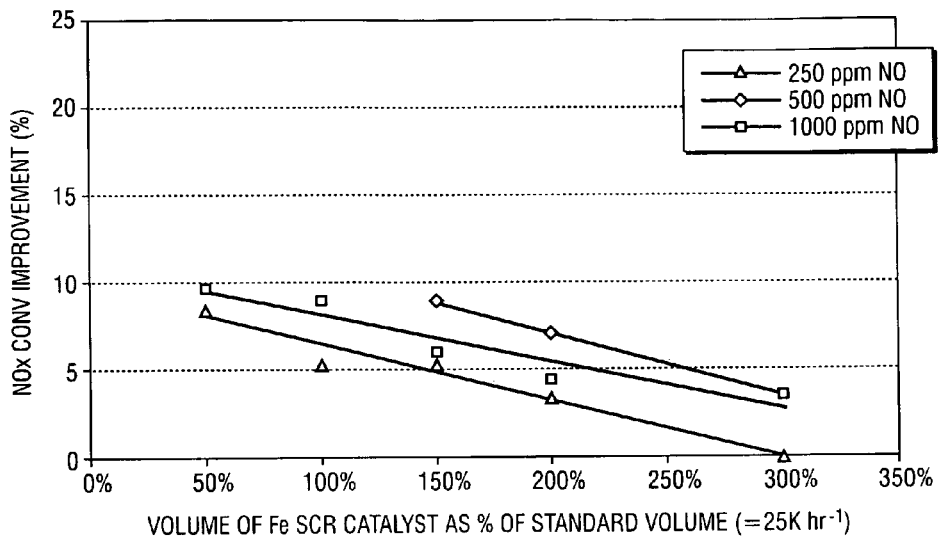
FIG. 12 is a graph that shows the improvement in $NO_x$ conversion at 250° C. from increasing the volume of Cu SCR catalyst from 50% to 100% as a function of the volume of Fe SCR catalyst.

Finally, tests were performed on systems where the volume of the rear Cu SCR catalyst was increased to 100% of the standard sample volume in an attempt to improve the low temperature performance while maintaining the high temperature performance. For NO concentrations of 250, 500, and 1000 ppm, NO and $NH_3$, FIGS. 8, 9, and 10 show the $NO_x$ conversion at 250° C. and 700° C. for systems with different volumes of Fe SCR catalyst in front of 50% Cu and 100% Cu SCR catalysts; the exhaust also contains 5% $O_2$, 10% $CO_2$, 10% $H_2O$, and balance $N_2$. For all 3 NO concentrations and for the smallest volume of Fe SCR catalyst, the conversion improved by about 8% at 250° C. with the increased volume of Cu SCR catalyst. The improvement at 200° C. (not shown) was closer to 14%. However, as the volume of Fe SCR catalyst increased, the improvement with the larger volume of Cu SCR catalyst decreased. This is indicated in FIGS. 11 and 12, which show the improvement in $NO_x$ conversion with the increased volume of Cu SCR catalyst as a function of the volume of Fe SCR catalyst for different NO concentrations at 200° C. and 250° C., respectively. When the volume of Fe SCR catalyst was 300% of the standard sample volume, the average improvements from increasing the Cu SCR catalyst volume from 50% to 100% were only 4.7% and 2.4% at 200° C. and 250° C., respectively.

Figure 13:
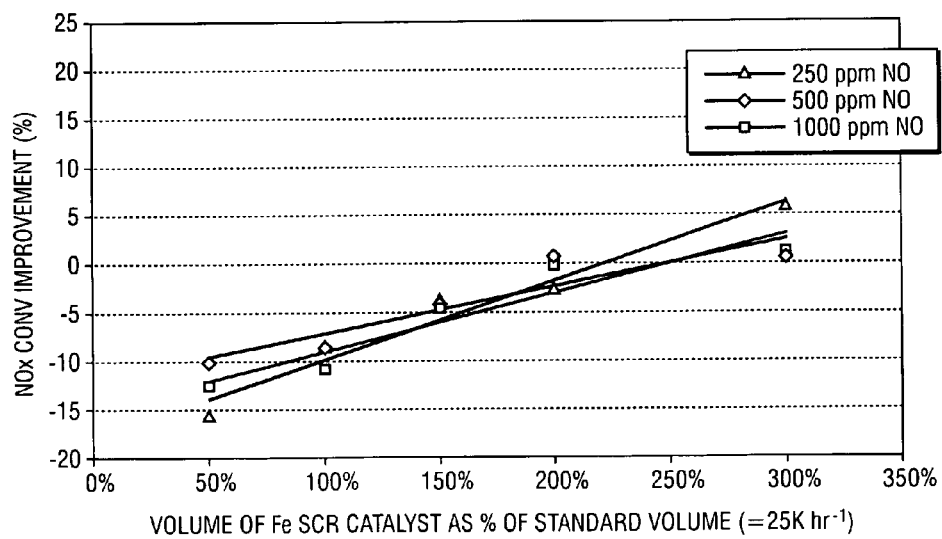
FIG. 13 is a graph that shows the decrease in $NO_x$ conversion at 700° C. from increasing the volume of Cu SCR catalyst from 50% to 100% as a function of the volume of Fe SCR catalyst.

As shown in FIG. 13, for the smaller volumes of Fe SCR catalyst, the performance at 700° C. actually decreased with the larger volume of Cu SCR catalyst, attributable to increased production of NO from the $NH_3$ slipping through the Fe section. The average penalty was about 13% with the smallest volume of Fe SCR catalyst. However, as the volume of Fe SCR catalyst increased, the penalty in high temperature conversion associated with the increased volume of Cu SCR catalyst decreased. This is indicated in FIG. 13, which shows the penalty in $NO_x$ conversion with the increased volume of Cu SCR catalyst as a function of the volume of Fe SCR catalyst at 700° C. When the volume of Fe SCR catalyst was at least 200% of the standard sample volume, there was very little penalty associated with the increased volume of Cu SCR catalyst.

While the $NO_x$ conversion at 700° C. seemed to plateau with 150% Fe SCR catalyst when evaluated with 250 ppm and 500 ppm NO, the conversion at 700° C. continued to increase as the volume of Fe SCR catalyst increased to 300% when evaluated with 1000 ppm NO (FIG. 10). Therefore, the larger volumes of the Fe section made the system more effective with high NO concentrations at high temperatures.

Accordingly, from the above studies, a SCR system consisting of 150% Fe+50% Cu provides good $NO_x$ conversion over most conditions of temperature and NO concentration. However, with high NO concentrations (e.g., 1000 ppm) and high temperatures (e.g., 700° C.), the $NO_x$ conversion did improve significantly when the volume of the Fe SCR was increased from 150% to 300%. Also, 200% or 300% Fe SCR catalyst essentially eliminated the penalty at high temperatures associated with increasing the Cu section from 50% to 100%. Therefore, the SCR system providing the most robust $NO_x$ conversion at different temperatures and NO concentrations after aging consists of a front section of Fe SCR catalyst that ranges from 200% to 300% of the standard sample volume followed by a Cu SCR catalyst that ranges from 50% to 100% of the standard sample volume. If the front Fe section is only 200% of the standard sample volume, the rear Cu SCR section needs to be 100% of the standard sample volume to provide high $NO_x$ conversion at low temperatures (e.g., 200° C. and 250° C.). If the Fe section is 300% of the standard sample volume, the rear Cu section can be reduced to 50% of the standard sample volume. Thus, the overall volume providing the best performance at all temperatures and NO concentrations needs to range from 300% to 350% of the standard sample volume. Since the standard sample volume corresponds to a space velocity of 25K $hr^{-1}$, the maximum space velocity needs to be 7,000 to 8,300 $hr^{-1}$ in order to provide maximum $NO_x$ conversion.

In another embodiment, to address the cold start emission cycle, a small copper section is placed in front of a much larger iron section, which is followed by another copper section, so that the SCR catalyst is composed of three zones, a first, smaller copper zone, followed by larger iron and copper zones in that order. It is believed that in the embodiment where a large copper section is in front, there is a greater likelihood that the copper will oxidize the $NH_3$ to $N_2$ (subscript 2) or NO at high temperatures, taking away $NH_3$ that is needed to reduce $NO_x$ and also generating more $NO_x$ in the event that the $NH_3$ is oxidized to NO. Accordingly, in one embodiment, to address the effect of cold start emissions, a small copper section is placed in front of the larger iron section, which is followed by a second copper section.

Under this embodiment, the volume of the front copper section can preferably be 25% to 75% of the volume of the rear copper section. Providing a front section of copper SCR is believed to improve the cold start emissions and, by making the front copper section small, it is further believed that this will minimize the amount of $NH_3$ oxidized to N2 or NO at high temperatures. This SCR embodiment would result in good conversion efficiencies at both high and low temperature ranges, although at the high temperatures there may be a bit of a tradeoff relative to the two-zone, iron-copper embodiment.

A preferred range for the zones in the three-zone embodiment includes a first zone that comprises between 23% and 4% of the total SCR catalyst volume, a second zone that comprises between 46% and 82% of the total SCR catalyst volume, and the third zone that comprises between 31% and 14% of the total SCR catalyst volume, wherein the maximum space velocity ranges from 4,000 to 19,000 $hr^{-1}$.

Another preferred range for the three-zone embodiment includes a front copper zone that comprises between 21% and 5% of the total SCR catalyst volume, a second zone that comprises between 51% and 76% of the total SCR catalyst volume, and the third zone that comprises between 28% and 19% of the total SCR catalyst volume, wherein the maximum space velocity ranges from 6,000 to 14,000 $hr^{-1}$.

Another preferred range for the three-zone embodiment includes a front copper zone that comprises between 21% and 6% of the total SCR catalyst volume, a second zone that comprises between 51% and 71% of the total SCR catalyst volume, and the third zone that comprises between 28% and 24% of the total SCR catalyst volume, wherein the maximum space velocity ranges from 6,000 to 12,000 $hr^{-1}$.

Another preferred range for the three-zone embodiment includes a front copper zone that comprises between 16% and 2% of the total SCR catalyst volume, a second zone that comprises between 63% and 88% of the total SCR catalyst volume, and the third zone that comprises between 21% and 10% of the total SCR catalyst volume, wherein the maximum space velocity ranges from 4,000 to 10,000 $hr^{-1}$.

Figure 14:
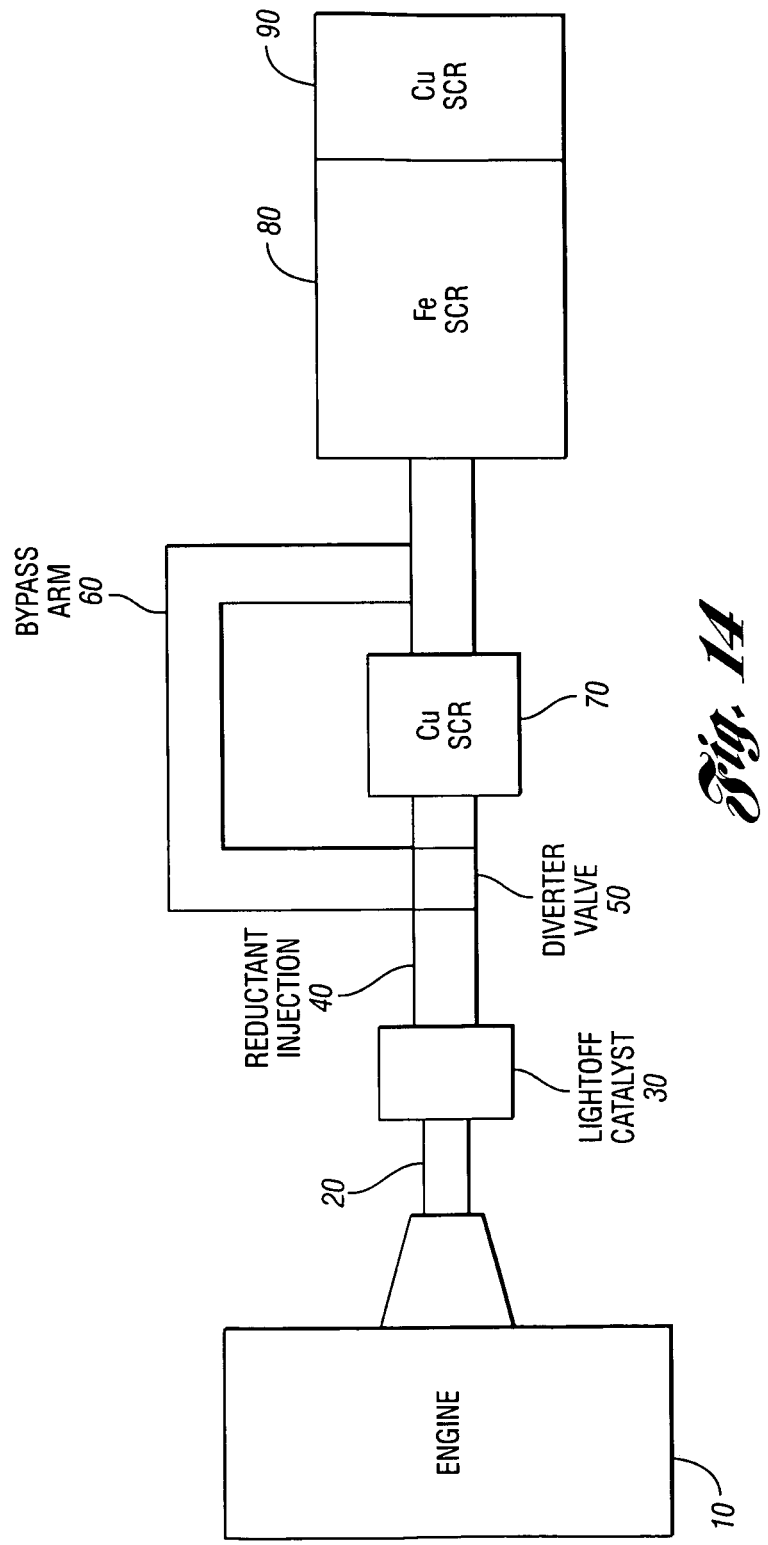
FIG. 14 is a schematic that shows the diverter valve embodiment layout.

In yet another embodiment, a diverter valve would be included in the system to eliminate any $NO_x$ penalty produced by the front Cu catalyst. As shown in greater detail in FIG. 14, while the front Cu catalyst 70 improves the lightoff of the catalyst, it produces a penalty in the $NO_x$ conversion at high temperatures because the front Cu catalyst 70 oxidizes some of the $NH_3$ to N2 or NO, which takes away $NH_3$ that the Fe SCR catalyst 80 could use for $NO_x$ conversion. Under this alternate embodiment, the exhaust flow 20 is diverted around the front Cu SCR catalyst 70 using a diverter valve 50 and bypass arm 60 when the engine 10 is operating at high temperatures to preserve $NH_3$ so the Fe SCR catalyst 80 can use the $NH_3$ to reduce $NO_x$ at high temperatures. This allows the system to use the front Cu catalyst 70 for improved lightoff but eliminates any penalty when the engine 10 is operating at high temperatures. Also, this allows the system to use a larger Cu SCR in the front position 70 to improve the lightoff performance even more. As shown in FIG. 14, a catalyst 30 such as a three-way catalyst or a diesel oxidation catalyst is positioned upstream of the diverter valve 50 and a reductant such as urea or $NH_3$ is injected at a position 40 between the catalyst 30 and the diverter valve 50.

In one alternate configuration, the front CU SCR, 70, could be placed within the bypass arm itself to produce similar results.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

What is claimed:

1. A selective catalytic reduction system for lean-burn gasoline and diesel engine emissions that expands the operating temperature range of the system, comprising a first and second zone, wherein the first zone is composed of an iron SCR catalyst and a second zone is composed of a copper SCR catalyst, and wherein the second zone is positioned adjacent and downstream of the first zone.

2. The selective catalytic reduction system of claim 1, wherein the first zone comprises 60% to 85% of the total SCR catalyst volume and the second zone comprises 15 to 40% of the total SCR catalyst volume and the maximum space velocity ranges from 5,000 to 20,000 $hr^{-1}$.

3. The selective catalytic reduction system of claim 1, wherein the first zone comprises 65% to 80% of the total SCR volume and the second zone comprises 20% to 35% of the total SCR catalyst volume and the maximum space velocity ranges from 7,500 to 15,000 $hr^{-1}$.

4. The selective catalytic reduction system of claim 1, wherein the first zone comprises 65% to 75% of the total SCR catalyst volume and the second zone comprises 25% to 35% of the total SCR catalyst volume and the maximum space velocity ranges from 7,500 to 12,500 $hr^{-1}$.

5. The selective catalytic reduction system of claim 1, wherein the first zone comprises 75% to 90% of the total SCR catalyst volume and the second zone comprises 10% to 25% of the total SCR catalyst volume and the maximum space velocity ranges from 5,000 to 10,000 $hr^{-1}$.

6. A selective catalytic reduction system for lean-burn gasoline and diesel engines, comprising a first, second and third zone, wherein the first zone is composed of a copper SCR catalyst, the second zone is composed of an iron SCR catalyst, and the third zone is composed of a copper SCR catalyst, wherein the third zone is adjacent and positioned downstream of the second zone and wherein the second zone is adjacent and positioned downstream of the first zone.

7. The selective catalyst reduction system of claim 6, wherein the total SCR catalyst volume of the first copper zone is between 25%-75% of the total SCR catalyst volume of the third copper zone.

8. The selective catalytic reduction system of claim 6, wherein the front copper zone is between 23 and 4% of the total SCR catalyst volume, the second iron zone is between 46 and 82% of the total SCR catalyst volume, and the third copper zone is between 31 and 14% of the total SCR catalyst volume, and the maximum space velocity ranges from 4,000 to 19,000 $hr^{-1}$.

9. The selective catalytic reduction system of claim 6, wherein the front copper zone is between 21 and 5% of the total SCR catalyst volume, the second iron zone is between 51 and 76% of the total SCR catalyst volume, and the third copper zone is between 28 and 19% of the total SCR catalyst volume, and the maximum space velocity ranges from 6,000 to 14,000 hr$^{-1}$.

10. The selective catalytic reduction system of claim 6, wherein the front copper zone is between 21 and 6% of the total SCR catalyst volume, the second iron zone is between 51 and 71% of the total SCR catalyst volume, and the third copper zone is between 28 and 24% of the total SCR catalyst volume, and the maximum space velocity ranges from 6,000 to 12,000 hr$^{-1}$.

11. The selective catalytic reduction system of claim 6, wherein the front copper zone is between 16 and 2% of the total SCR catalyst volume, the second iron zone is between 63 and 88% of the total SCR catalyst volume, and the third copper zone is between 21 and 10% of the total SCR catalyst volume, and the maximum space velocity ranges from 4,000 to 10,000 hr$^{-1}$.

12. A durable catalyst system for the reduction of emissions from an engine exhaust stream, comprising:

a light-off catalyst closely coupled to the engine;
a first copper selective catalytic reduction catalyst positioned downstream of the light-off catalyst;
a reductant injection system positioned between the light-off catalyst and the first copper selective catalytic reduction catalyst;
a diverter valve positioned downstream of the location for reductant injection and upstream of the first copper selective catalytic reduction catalyst, the diverter valve being connected to a bypass arm that can be utilized to bypass the first copper selective reduction catalyst and improve NOx conversion under high temperature conditions; and
a second catalytic reduction catalyst that includes a first Fe SCR catalyst and a second Cu SCR catalyst, wherein the second Cu SCR catalyst is positioned downstream of the Fe SCR catalyst.

* * * * *